M. J. TRUMBLE.
STEAM GENERATOR.
APPLICATION FILED APR. 11, 1918.

1,356,098.

Patented Oct. 19, 1920.
2 SHEETS—SHEET 1.

Inventor
Milton J. Trumble
by Graham & Hann
Attorney

M. J. TRUMBLE.
STEAM GENERATOR.
APPLICATION FILED APR. 11, 1918.
1,356,098.
Patented Oct. 19, 1920.
2 SHEETS—SHEET 2.
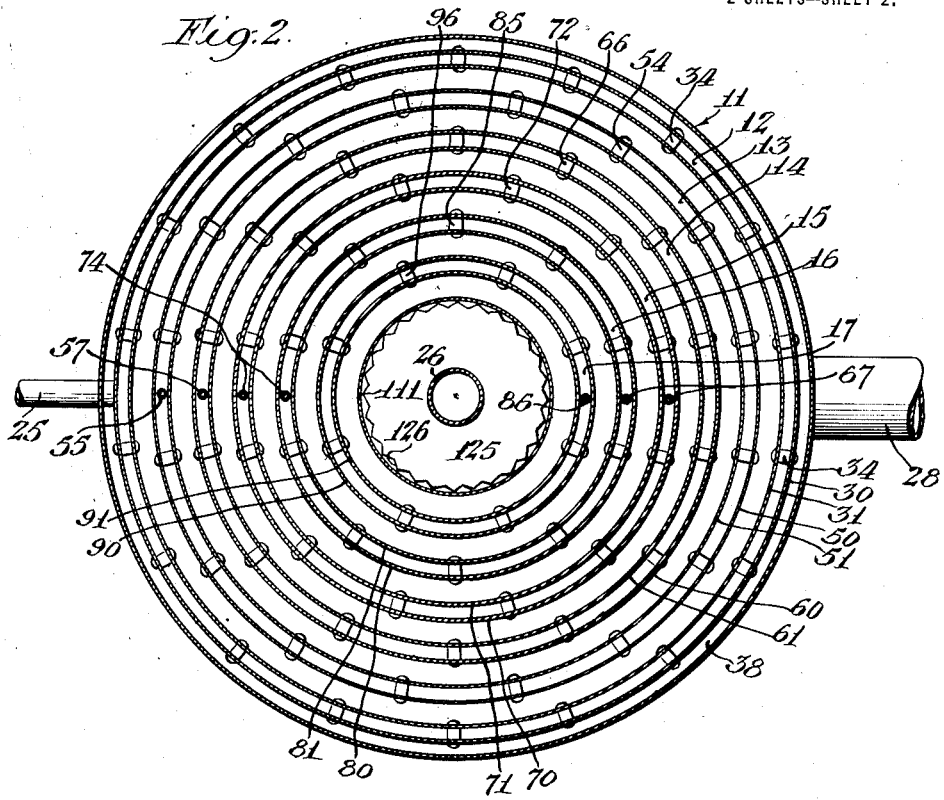
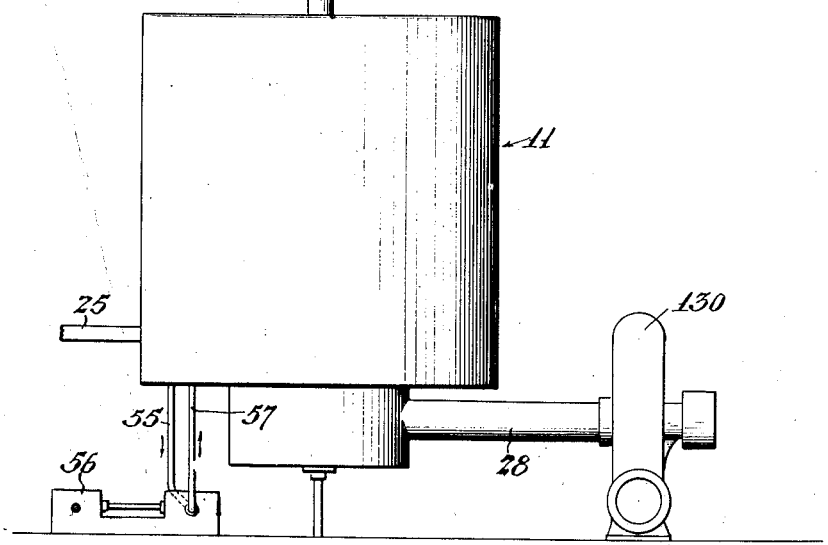
Inventor
Milton J. Trumble.
by Graham + ?
Attorneys

UNITED STATES PATENT OFFICE.

MILON J. TRUMBLE, OF ALHAMBRA, CALIFORNIA.

STEAM-GENERATOR.

1,356,098. Specification of Letters Patent. Patented Oct. 19, 1920.

Application filed April 11, 1918. Serial No. 228,070.

*To all whom it may concern:*

Be it known that I, MILON J. TRUMBLE, a citizen of the United States, residing at Alhambra, in the county of Los Angeles and State of California, have invented a new and useful Improvement in Steam-Generators, of which the following is a specification.

My invention relates to the art of power generation by means of steam, and the particular object of the invention is to provide a new and useful form of steam generator which is particularly suited for use on steam automobiles. The steam generator to be applicable to this service must be light in weight and have a large heating surface, as compared to the volume of water contained. It must also be arranged so that the gases used for heating are at a low temperature as they leave the generator, thus insuring a high efficiency. All of these advantages are found in generators built in accordance with my invention.

Further objects and advantages will be made evident hereinafter, or will be evident to one skilled in the art upon his obtaining a full comprehension of the disclosures herein.

Referring to the drawings, which illustrate an efficient form of my invention,

Fig. 2 is a section on a plane represented by the line 2—2 of Fig. 1.

Fig. 3 is a side elevation of the invention as equipped with its auxiliaries.

Figure 1:
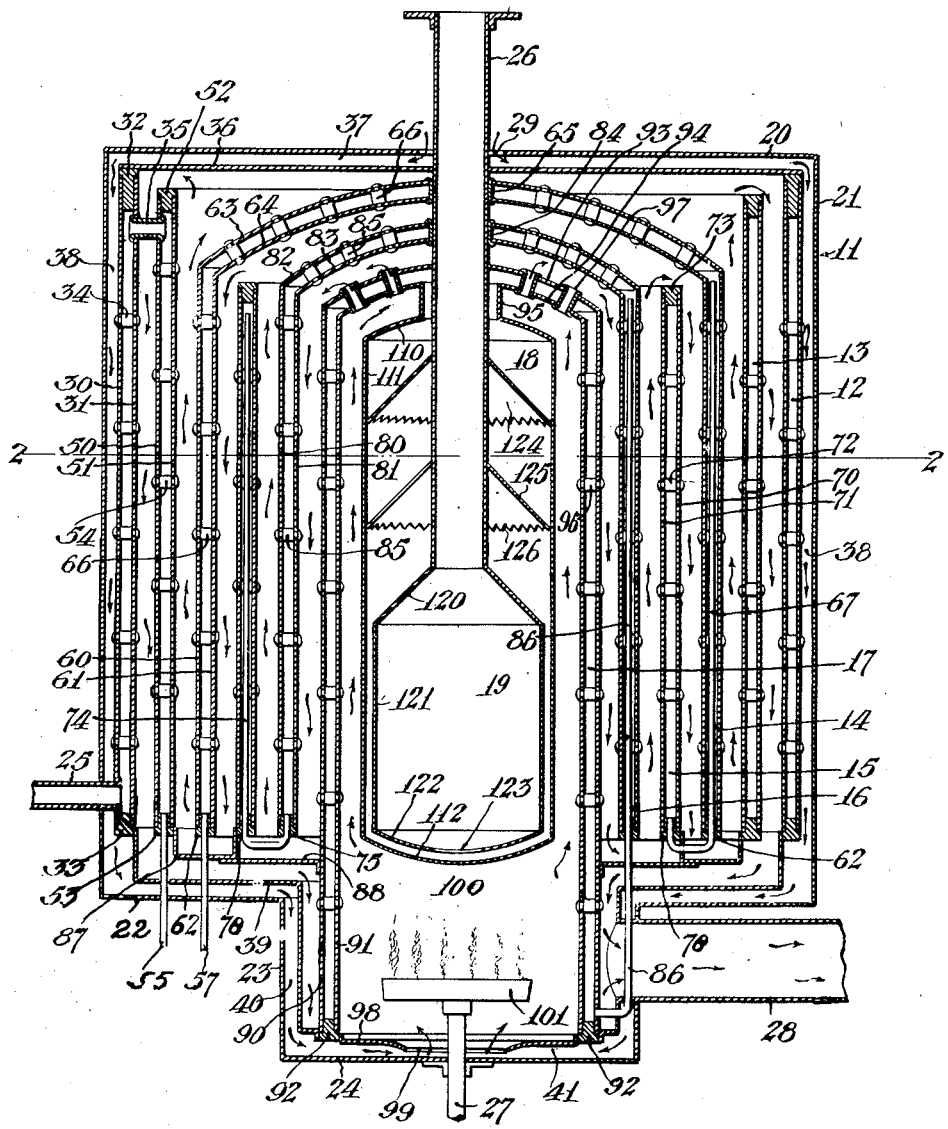
Figure 1 is a section of my invention on a plane represented by the line 1—1 of Fig. 2.

Broadly considered the invention consists of an outer shell 11, preheating chambers 12 and 13, heating chambers 14, 15, 16 and 17, a vaporizing chamber 18, and an expanding chamber 19. The outer shell 11 consists of a top 20, a cylindrical outer wall 21 and an annular bottom 22. The outer shell 11 is also provided with an extension formed of a cylindrical outer wall 23 and a bottom 24. The members 20 to 24 inclusive are preferably formed of sheet iron, the seams being oxy-acetylene welded so as to form a tight vessel through which projects a water inlet pipe 25, a steam outlet pipe 26, a fuel pipe 27 and a flue 28. The members 25 to 28 inclusive are secured in gas tight relationship wherever they pass through the outer shell 11 with the exception of the steam outlet pipe 26 which passes through a large opening 29 formed in the top 20, this opening being hereinafter called the combustion air opening.

The first of the preheating chambers 12 consists of cylindrical walls 30 and 31 which inclose an annular space closed at the top by ring 32 and at the bottom by a ring 33, the rings 32 and 33 being welded to the cylinders 30 and 31 so that they are gas tight. A series of stay-bolts 34 connect the cylinders 30 and 31 together and prevent buckling as well as increase the metal area in contact with the water. The water inlet pipe 25 connects directly into the bottom of the first preheating chamber 12, and a water transfer pipe 35 connects the top of this chamber with the top of the second preheating chamber 13.

A circular sheet 36 is welded to the ring 32 and to the steam outlet pipe 26 forming an air inlet space 37 which is in open communication with the combustion air inlet opening 29 and an air space 38 formed between the cylinder 30 and the outer wall 21. A shallow pan 39 is welded to the bottom of the cylinder 31 and to the wall of the inner heating chamber 17 forming with the members 21, 22, 23 and 24 a further air space 40 which is in open communication with the space 38, and with the interior of a combustion chamber hereinafter described.

The second preheating chamber 13 is formed of a cylinder 50 and a cylinder 51 which inclose an annular space and which are welded to rings 52 and 53 at the top and bottom respectively. Stay-bolts 54 connect the cylinders 50 and 51. A pump inlet pipe 55 connects into the bottom of the second preheating chamber 13, this pipe being connected into a pump 56 which delivers the water under pressure to a pump outlet pipe 57 which is connected into the bottom of the heating chamber 14.

The heating chamber 14 consists of cylinders 60 and 61 which are welded to a plug 62 into which the pipe 57 connects. The top of the cylinders 60 and 61 are welded to dome sheets 63 and 64 which extend over as shown in Fig. 1 and which are welded to a sleeve 65 which surrounds the steam outlet pipe 26 in gas tight relationship therewith. Stay-bolts 66 are provided between the cylinders 60 and 61 and the dome sheets 63 and 64. A water transfer pipe 67 extends through the ring 62 to a point near the top of the heating chamber 14 and connects through a ring 78 with the bottom of the second heating chamber 15. This heating chamber consists of cylinders 70 and 71 connected by stay-bolts 72 and welded at the bottom into the ring 78 and at the top into a similar ring 73. An outlet pipe 74 extends through the ring 78 into the top of the third heating chamber 16 and is connected into a ring 75 forming the bottom of the third heating chamber 16. The third heating chamber 16 is composed of cylinders 80 and 81 welded at the bottom to the ring 75 and welded at the top to dome sheets 82 and 83 which are in turn welded into a sleeve 84 surrounding the steam outlet pipe 26 in gas tight relationship therewith. Stay-bolts 85 are provided between the cylinders 80 and 81 and the dome sheets 82 and 83.

A steam outlet pipe 86 passes through the ring 75 to a point near the top of the heating chamber 16 and extends downwardly and connects to the bottom of the heating chamber 17. The cylinder 51 and the cylinder 70 are connected by a ring 87 and this ring 87 is connected by means of a disk 88 with a cylinder 90 which forms the outer wall of the heating chamber 17. A cylinder 91 is provided forming the other wall. The cylinders 90 and 91 are welded at the bottom into a ring 92 and at the top into dome sheets 93 and 94. The dome sheet 93 is welded to the steam outlet pipe 26 and the dome sheet 94 is welded to a sleeve 95 surrounding the steam outlet pipe 26 but separated therefrom by an annular space. Stay-bolts 96 are provided between the cylinders 90 and 91 and hollow tubes 97 are provided connecting the dome sheets 93 and 94 and providing openings therethrough.

The flue 28 passes through the cylinder 23 and connects into the member 39. A deflector cover 98 is secured in the ring 92 having an opening 9⁹ which communicates with the combustion chamber 100 in which is placed an oil or gas burner 101 which is connected to a fuel pipe 27.

The vaporizing chamber 18 is welded to the sleeve 95 and consists of a domed top 110, a cylindrical wall 111 and a domed bottom 112. The steam outlet pipe 26 extends downwardly inside the vaporizing chamber 18 and carries the expanding chamber 19 which consists of a conical top 120, a cylindrical wall 121 and a domed bottom 122 having an opening 123 therein. Cones 124 and 125 are welded to the steam outlet pipe 26 and fit loosely inside the cylinder 111 having a plurality of serrations 126 around the periphery thereof.

An exhaust fan 130 or other draft producing device is attached to the flue 28.

The method of operation of the invention is as follows:—

Water being supplied from any convenient source (not shown) enters the preheating chamber 12 through the pipe 25 flowing through that chamber and through the pipe 35 into the preheating chamber 13. In these chambers the temperature of the water is raised to a point somewhat below the boiling point of water, and the hot water is drawn by the pump 56 through the pipe 55 from the chamber 13 and forced by the pipe 57 into the bottom of the heating chamber 14. It is taken from the top of the chamber 14 by the pipe 67 and delivered to the bottom of the chamber 15. It passes from the top of the chamber 15 through the pipe 74 into the bottom of the chamber 16 and from the top of the chamber 16 it passes through the pipe 86 into the bottom of the chamber 17. In its passage through the chambers 14, 15, 16 and 17 the temperature of the water is raised to such a degree that considerable steam may be formed. The mixture of steam and water passes through the sleeve 95 into the top of the vaporizing chamber 18, passing downwardly therethrough, and passing through the serrations 127 of the cones 124 and 125 to the space between the wall of the expanding chamber 19 and the vaporizing chamber 18 in which the remaining water is vaporized so that live steam is delivered to the bottom of the expanding chamber through the opening 123. This steam passes upwardly through the steam outlet pipe 26, and is delivered to the engine or other device in which it is desired to utilize it.

The hot gases from the burner 101 first heat the conical bottom 112 of the vaporizing chamber 18 and pass upwardly between the vaporizing chamber 18 and the heating chamber 17, passing through the tubes 97 into the space between the domed tops of the heating chambers 17 and 16. The hot gases then pass downwardly between the chambers 16 and 17 upwardly between the chambers 15 and 16, downwardly between the chambers 14 and 15, upwardly between the chambers 13 and 14, and downwardly between the chambers 12 and 13 and into the space between the members 38 and 39, being drawn from this space through the flue 28 by means of the exhaust fan 130. The air for combustion enters the generator through the combustion air inlet 29, passes through the spaces 37 and 38 downwardly between the outer wall of the shell 11 and the preheating chamber 12, being delivered through the opening 99 to the combustion chamber 100.

In its passage through the generator this air is preheated so that the efficiency of the combustion produced by the burner 101 is high. By surrounding the entire generator with an inflowing current of air which is later used for combustion, I am able to do away with almost all radiation losses found in the conventional types of steam generators. From a consideration of the direction of flow of the water and the gases of combustion it will be noted that these directions of flow are opposed to each other, so that the water is first subjected to the greatly cooled gases, and as the water flows inwardly toward the center of the generator, the temperature of these gases progressively increases, so that in and around the vaporizing chamber 18 the greatest concentration of heat is produced. It will also be noted that the areas of the successive heating and preheating chambers are constantly diminishing as we approach the center, so that the speed of the water constantly increases in its passage through the generator until it is finally delivered as steam into the expanding chamber 19.

In the construction of my generator I prefer to use sheet iron throughout, and I prefer to join the various sheet iron members and to secure the stay-bolts, etc., by the use of welded seams preferably made by an oxy-acetylene torch.

I claim as my invention:

A boiler comprising two concentric shells forming an annular water heating space; walls forming a cylindrical vaporizing chamber located in spaced relationship inside said shells, the upper portion of said vaporizing chamber being in communication with said water heating space; a burner inside said shells and below said vaporizing chamber; walls forming an expanding chamber inside said vaporizing chamber, said expanding chamber being in open communication with the bottom of said vaporizing chamber near the bottom thereof; a steam outlet pipe connected into the top of said expanding chamber and passing through the top of said vaporizing chamber; and a series of cones secured about said steam outlet pipe for spreading in a thin film on the inner side of the wall of said vaporizing chamber the water delivered to the top of said vaporizing chamber.

In testimony whereof, I have hereunto set my hand at Los Angeles, California, this 4th day of April, 1918.

MILON J. TRUMBLE.